United States Patent
Obara

(10) Patent No.: US 9,128,316 B2
(45) Date of Patent: Sep. 8, 2015

(54) PORTABLE ELECTRONIC DEVICE

(75) Inventor: Tatsuhiro Obara, Chiba (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 189 days.

(21) Appl. No.: 13/535,489

(22) Filed: Jun. 28, 2012

(65) Prior Publication Data

US 2013/0003271 A1 Jan. 3, 2013

(30) Foreign Application Priority Data

Jun. 29, 2011 (JP) ................................. 2011-144946

(51) Int. Cl.
*G06F 1/16* (2006.01)
*G02F 1/1333* (2006.01)
*A63F 13/90* (2014.01)

(52) U.S. Cl.
CPC .......... *G02F 1/133308* (2013.01); *A63F 13/08* (2013.01); *G06F 1/1601* (2013.01); *G06F 1/1637* (2013.01); *A63F 2300/204* (2013.01)

(58) Field of Classification Search
CPC ... G06F 1/1607; G06F 1/1637; G06F 1/1601; G02F 1/133308
USPC ............. 361/679.01–679.45, 679.55–679.59; 345/156, 157, 168, 169, 905; 455/575.1, 550.1, 575.3; 349/58–60
See application file for complete search history.

(56) References Cited

U.S. PATENT DOCUMENTS

| | | | |
|---|---|---|---|
| 4,621,373 A | * | 11/1986 | Hodsdon ...................... 455/90.3 |
| 5,940,153 A | * | 8/1999 | Castaneda et al. ............. 349/58 |
| 7,271,861 B2 | * | 9/2007 | Yamazaki ....................... 349/58 |
| 2003/0184514 A1 | | 10/2003 | Grosfeld et al. |
| 2006/0171107 A1 | * | 8/2006 | Yamamoto et al. ........... 361/683 |
| 2007/0132906 A1 | | 6/2007 | Shen et al. |
| 2007/0202956 A1 | | 8/2007 | Ogasawara et al. |
| 2010/0048249 A1 | | 2/2010 | Furuta et al. |
| 2011/0228458 A1 | * | 9/2011 | Richardson et al. ..... 361/679.01 |
| 2011/0261510 A1 | * | 10/2011 | Liu ........................... 361/679.01 |
| 2012/0287566 A1 | * | 11/2012 | Shiogama et al. ....... 361/679.01 |

FOREIGN PATENT DOCUMENTS

| | | |
|---|---|---|
| CN | 1979277 | 6/2007 |
| CN | 101416474 | 4/2009 |
| EP | 1 675 363 | 6/2006 |

(Continued)

OTHER PUBLICATIONS

Japanese Office Action dated Nov. 26, 2013, from corresponding Japanese Application No. 2011-144946.
Japanese Office Action dated May 21, 2013 from the corresponding Japanese Application No. 2011-144946.
Chinese First Office Action dated Aug. 21, 2014 from corresponding Application No. 201210225082.0.
European Search Report dated Jun. 16, 2015 from corresponding Application No. 12173672.2.

*Primary Examiner* — Nidhi Thaker
(74) *Attorney, Agent, or Firm* — Katten Muchin Rosenman LLP

(57) ABSTRACT

A dust-proof frame 30 includes a front frame portion 32 located on the outer periphery of the front surface of a display panel unit 20. The dust-proof frame 30 includes a convex portion 31 that projects from the front frame portion 32 toward the inner surface of a housing 10. A gap G1 is located in a pressing direction of the inner surface of the housing 10 with respect to the convex portion 31 and extends along the convex portion 31 is provided in the dust-proof frame 30. According to the above structure, the function of the dust-proof frame 30 can be improved.

10 Claims, 5 Drawing Sheets

(56) References Cited

FOREIGN PATENT DOCUMENTS

| JP | 03-092079 U | 9/1991 |
| JP | 04-042687 U | 4/1992 |
| JP | 2001-175608 A | 6/2001 |
| JP | 2003-296023 A | 10/2003 |
| JP | 2006-195146 A | 7/2006 |
| JP | 2006-235082 A | 9/2006 |
| JP | 2006235082 A * | 9/2006 |
| JP | 2007-214737 | 8/2007 |
| JP | 2007-214737 A | 8/2007 |
| JP | 2007214737 A * | 8/2007 |
| JP | 2007-298578 | 11/2007 |

* cited by examiner

PORTABLE ELECTRONIC DEVICE

CROSS-REFERENCE TO RELATED APPLICATION

The present application claims priority from Japanese application JP 2011-144946 filed on Jun. 29, 2011, the content of which is hereby incorporated by reference into this application.

BACKGROUND OF THE INVENTION

1. Field of the Invention

The present invention relates to a portable electronic device including a dust-proof member on the outer periphery of a display panel.

2. Description of the Related Art

Conventionally, a portable electronic device including a display panel housed in its housing is used (e.g., United States Patent Application Publication No. 2007/0202956). The portable electronic device is often exposed to dust when carried. Therefore, in some portable electronic device in the past, a dust-proof frame made of an elastic material is provided on the outer periphery of a display panel. The dust-proof frame is formed in a frame shape surrounding the display panel. The dust-proof frame is held between the inner surface of the housing and the outer periphery of the display panel.

SUMMARY OF THE INVENTION

In order to secure a sufficient dust-proof function, in some case, a convex portion that projects toward the inner surface of the housing is formed in the dust-proof frame. However, when such a dust-proof frame is held between the outer periphery of the display panel and the inner surface of the housing, in some case, permanent distortion occurs in the convex portion of the dust-proof frame and the dust-proof frame does not provide a sufficient elastic force.

A portable electronic device according to an aspect of the present invention includes a housing, a display panel unit arranged inside the housing, and a dust-proof frame made of an elastic material and provided on the outer periphery of the display panel unit. The dust-proof frame includes a front frame portion located on the outer periphery of the front surface of the display panel unit. The dust-proof frame further includes a convex portion. The convex portion projects from the front frame portion toward the inner surface of the housing, has a frame shape surrounding a display area of the display panel unit, and is pressed toward the display panel unit by the inner surface of the housing. A gap for allowing movement of the convex portion in the pressing direction of the inner surface of the housing is formed in the pressing direction with respect to the convex portion. According to the portable electronic device, it is possible to suppress permanent distortion from occurring in the convex portion of the dust-proof frame and maintain the elastic force of the dust-proof frame for a long period. As a result, it is possible to improve the function of the dust-proof frame. The gap is caused in a state before the inner surface of the housing is pressed against the convex portion. The gap does not always have to be present in a state in which the inner surface of the housing is pressed against the convex portion.

DETAILED DESCRIPTION OF THE INVENTION

Figure 1:
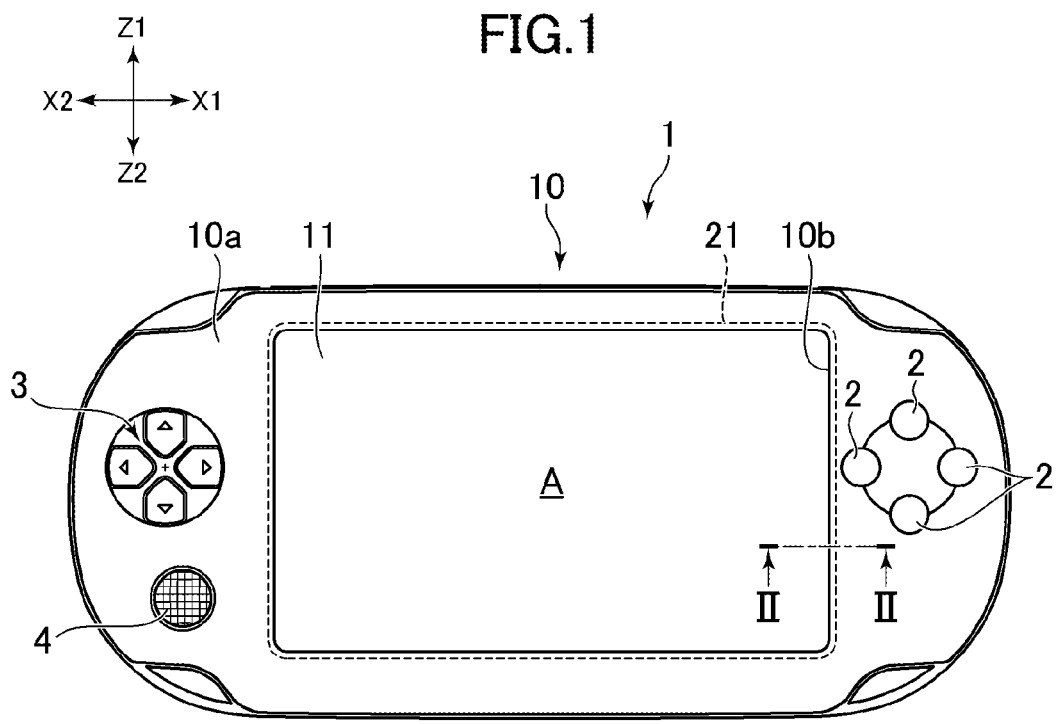
FIG. 1 is a front view of a portable electronic device according to an embodiment of the present invention.
Figure 2:
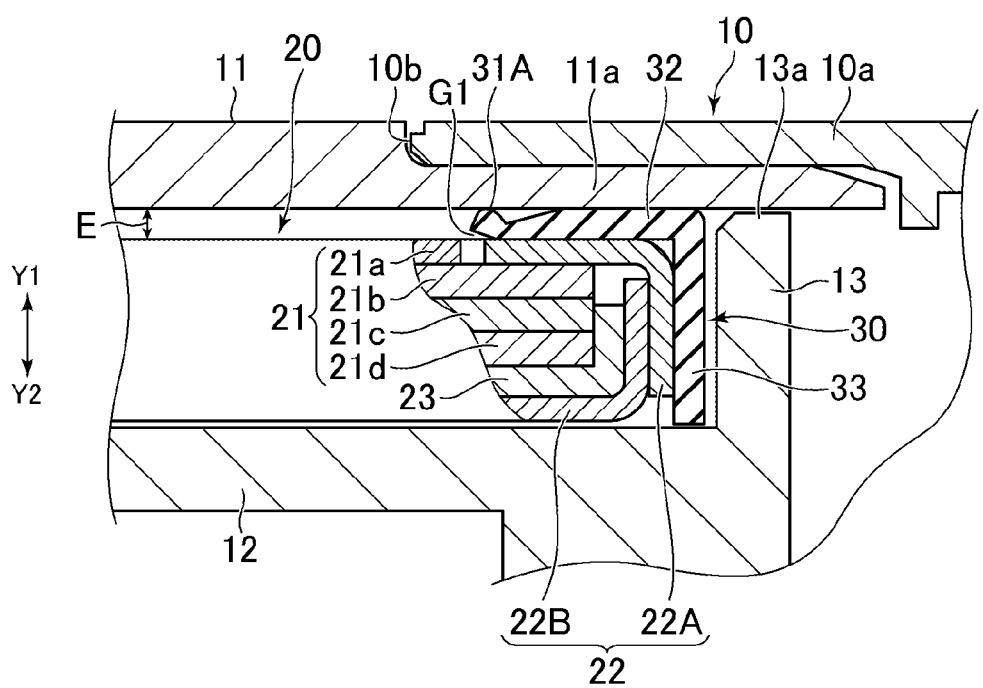
FIG. 2 is a sectional view taken along line II-II shown in FIG. 1.
Figure 3:
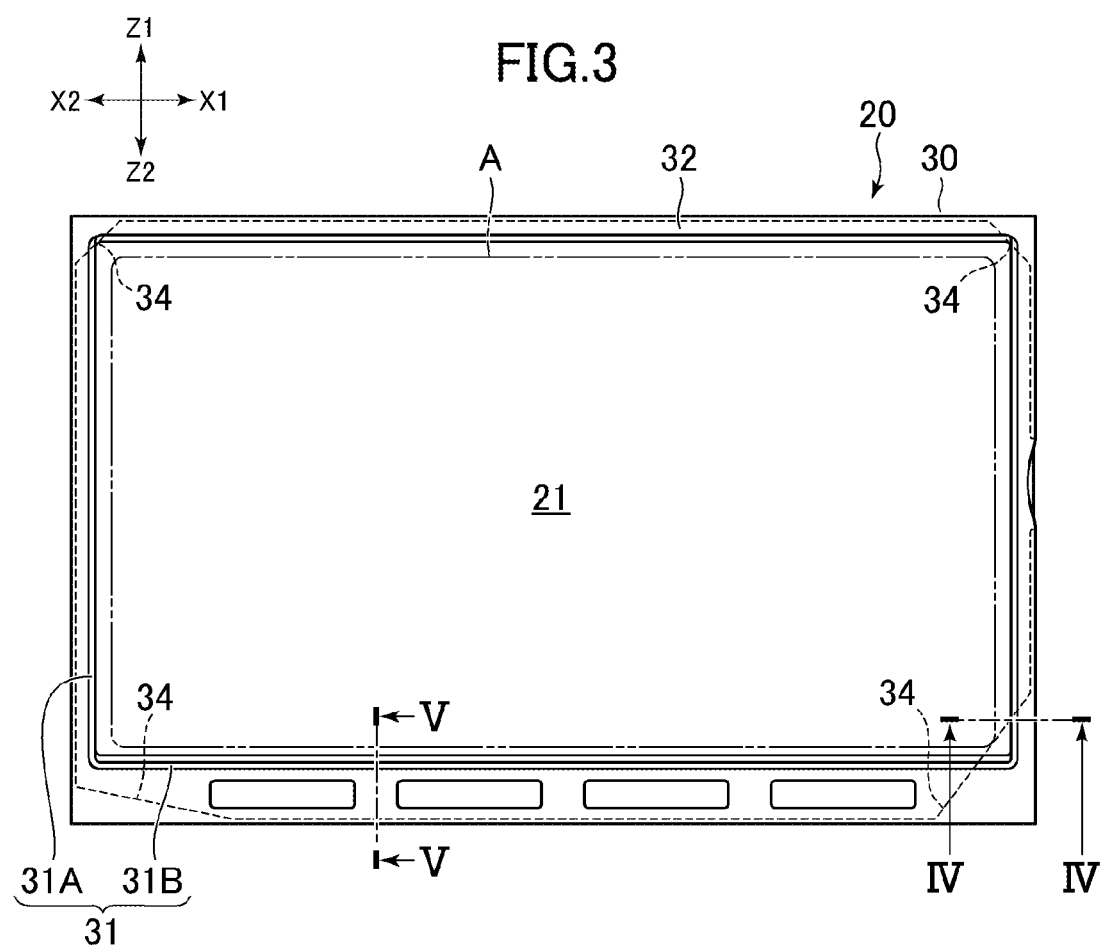
FIG. 3 is a front view of a display panel unit included in the electronic device.
Figure 4:
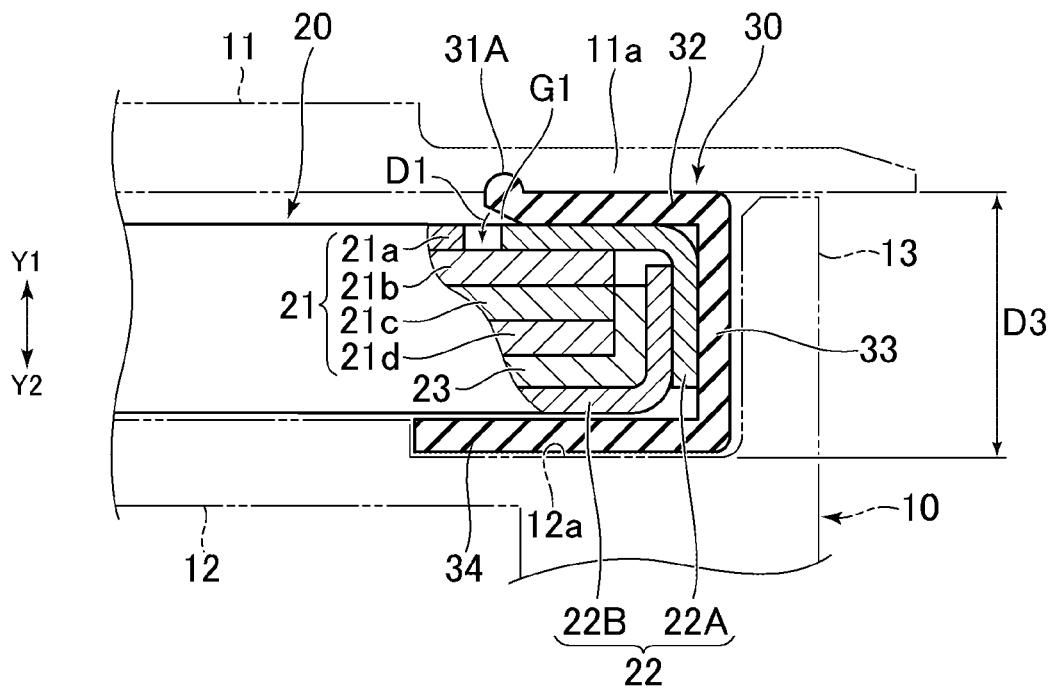
FIG. 4 is a sectional view taken along line IV-IV shown in FIG. 3.
Figure 5:
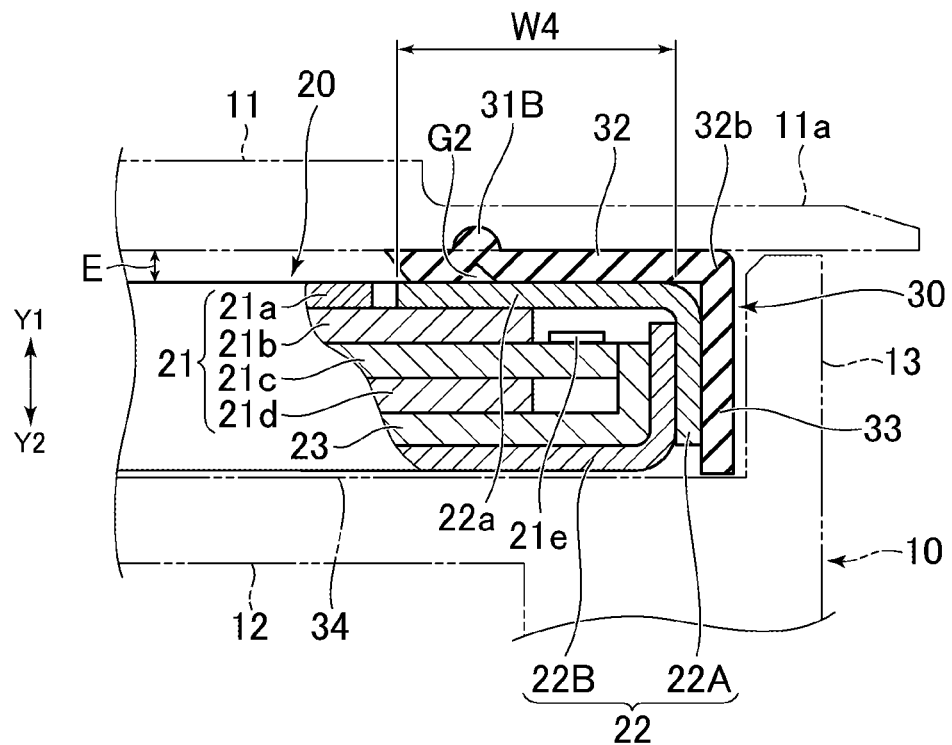
FIG. 5 is a sectional view taken along line V-V shown in FIG. 3.

Hereinafter, embodiments of the present invention will be explained with reference to the accompanying drawings. FIG. 1 is a front view of a portable electronic device 1 according to an embodiment of the present invention. FIG. 2 is a sectional view taken along line II-II shown in FIG. 1. FIG. 3 is a front view of a display panel unit 20 included in the electronic device 1. FIG. 4 is a sectional view taken along line IV-IV shown in FIG. 3. FIG. 5 is a sectional view taken along line V-V shown in FIG. 3. In the following explanation, Z1 and Z2 shown in FIG. 1 respectively indicate the upward direction and the downward direction. X1 and X2 shown in FIG. 1 respectively indicate the right direction and the left direction. Y1 and Y2 shown in FIG. 2 respectively indicate the front direction and the rear direction.

As shown in FIGS. 1 and 2, the electronic device 1 includes a rectangular display panel 21 on the front side thereof. The display panel 21 is, for example, a liquid crystal display panel or an organic electroluminescence panel. The display panel 21 includes plural plate members 21b, 21c, and 21d such as glass substrates and a film (e.g., a phase difference film) 21a stuck to the surfaces of the plate members 21b, 21c, and 21d. The electronic device 1 in this embodiment includes, as shown in FIG. 2, a plate like resin frame 23 on which the display panel 21 is placed and a metal frame 22 that houses the display panel 21 and the resin frame 23. The metal frame 22 in this embodiment includes a frame-shaped front frame 22A that surrounds the outer periphery of the display panel 21 and a back frame 22B arranged on the back of the display panel 21 and combined with the front frame 22A in the front-rear direction. The display panel unit 20 is configured by the display panel 21, the metal frame 22, and the resin frame 23. The display panel unit 20 does not always have to include one or both of the metal frame 22 and the resin frame 23.

The electronic device 1 explained herein is a portable game device. As shown in FIG. 1, plural operation members operable by a user are provided on the right side and the left side of the display panel 21. In this embodiment, plural (four in this embodiment) push buttons 2 are provided on the right side of the display panel 21. A direction key 3 is provided on the left side of the display panel 21. Further, an operation stick 4 is provided below the direction key 3. The operation stick 4 includes a shaft portion arranged in a posture projecting from the front surface of the electronic device 1. The operation stick 4 can be slid and tilted in the radial direction around the shaft portion and can be rotated in the circumferential direction of the shaft portion in a tilted state.

As shown in FIG. 2, the display panel unit 20 is housed in a housing 10. The housing 10 in this embodiment includes a housing main body 10a and a front panel 11. The housing main body 10a includes an opening 10b in a portion facing the display panel 21. The front panel 11 closes the opening 10b and covers the front surface of the display panel 21. In other words, the front panel 11 faces the display panel 21 in the thickness direction of the display panel 21 (in this embodiment the front-rear direction). The front panel 11 has light transmissivity. The user can see the display panel 21 through the front panel 11. The front panel 11 is formed of resin or glass.

As shown in FIGS. 2 and 3, the electronic device 1 includes a dust-proof frame 30 integrally molded of an elastic material such as elastomer. The dust-proof frame 30 is provided on the outer periphery of the display panel unit 20 and surrounds the entire outer periphery of the display panel unit 20. The dust-proof frame 30 includes a front frame portion 32 located on the outer periphery of the front surface of the display panel unit 20. In this embodiment, the front frame portion 32 is located on the front surface of the front frame 22A provided in the outer periphery of the display panel unit 20. The dust-proof frame 30 includes a convex portion 31. The convex portion 31 has a frame shape surrounding a display area A of the display panel unit 20 in front view of the display panel unit 20 (see FIG. 3). As shown in FIGS. 3 and 4, the convex portion 31 projects from the front frame portion 32 toward the inner surface of the housing 10 (in this embodiment, the inner surface of the front panel 11) and is pressed toward the outer periphery of the display panel unit 20 by the inner surface of the housing 10. The convex portion 31 is formed over the entire periphery of the dust-proof frame 30. The convex portion 31 in this embodiment includes a first convex portion 31A formed along the upper edge, the left edge, and the right edge of the display area A and a second convex portion 31B formed along the lower edge of the display area A. The entire periphery of the display area A is surrounded by the two convex portions 31A and 31B.

Figure 6:
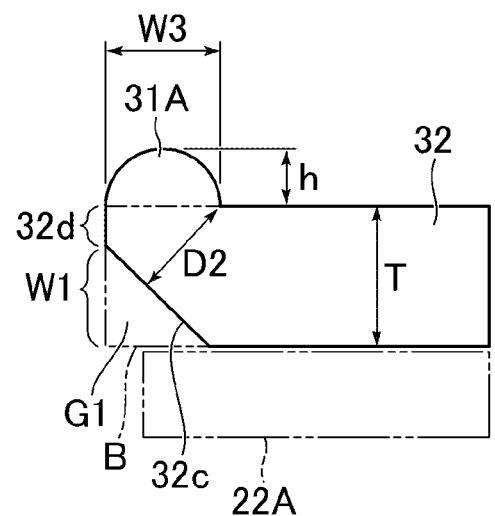
FIG. 6 is an enlarged sectional view of a first convex portion shown in FIG. 4.

As shown in FIG. 4, a gap G1 extending in a direction along the first convex portion 31A is formed. The gap G1 is positioned with respect to the first convex portion 31A in a pressing direction in which the inner surface of the front panel 11 presses the convex portion 31 (that is, the pressing portion is the thickness direction of the display panel 21; in this embodiment, the rear direction). The gap G1 allows movement of the first convex portion 31A in the pressing direction of the front panel 11 (see FIG. 2). In other words, the dust-proof frame 30 has a shape obtained by cutting a portion located in the pressing direction with respect to the first convex portion 31A such that the gap G1 is formed. FIG. 6 is an enlarged sectional view of the first convex portion 31A. Referring to the figure as an example, the dust-proof frame 30 has a shape obtained by cutting a portion B located below the first convex portion 31A so that the gap G1 is formed. The thickness of the front frame portion 32 decreases in a portion where the first convex portion 31A is provided, whereby the gap G1 is formed between the front frame portion 32 and the display panel unit 20. As explained later, the gap G1 and the first convex portion 31A in this embodiment are located at the inner peripheral edge of the front frame portion 32. The gap G1 is a concave recessing the inner peripheral portion in a direction parallel to the display panel unit 20. Note that, the portion B located below the first convex portion 31A may not always be a portion cut out after the dust-proof frame 30 is molded to include the portion B. In other words, the dust-proof frame 30 may be molded by the injection modeling such that the portion B is absent. The gap G1 is a gap which exist in a state before the front panel 11 is pressed against the first convex portion 31A. The gap G1 does not always exist in a state in which the front panel 11 is pressed against the first convex portion 31A.

As shown in FIG. 5, a gap G2 extending in a direction along the second convex portion 31B is formed. The gap G2 is positioned with respect to the second convex portion 31B in in the pressing direction in which the inner surface of the front panel 11 presses the second convex portion 31B. The gap G2 allows movement of the second convex portion 31B in the pressing direction of the front panel 11. In other words, the dust-proof frame 30 has a shape obtained by cutting out a portion located in the pressing direction with respect to the second convex portion 31B such that the gap G2 is formed. The thickness of the front frame portion 32 decreases in a portion where the second convex portion 31B is provided, whereby the gap G2 is formed between the front frame portion 32 and the display panel unit 20. In this embodiment, as explained later, a groove is formed in the front frame portion 32. This groove causes the gap G2. The gap G2 is caused in a state before the front panel 11 is pressed against the second convex portion 31B. The gap G2 does not always have to be present in a state in which the front panel 11 is pressed against the second convex portion 31B.

When the first convex portion 31A and the second convex portion 31B are pressed by the inner surface of the front panel 11, the front frame portion 32 bents toward the front frame 22A because of the gaps G1 and G2 (see FIG. 2). As a result, it is possible to reduce a load applied to the front panel 11 and the display panel 21. It is possible to suppress permanent distortion from occurring in the convex portions 31A and 31B of the dust-proof frame 30. It is possible to maintain the elastic force of the dust-proof frame 30 for a long period. As a result, tight contact of the first convex portion 31A and the front panel 11 and tight contact of the second convex portion 31B and the front panel 11 are maintained, which can improve the dust-proof function. The first convex portion 31A and the second convex portion 31B in this embodiment project toward the inner surface of the front panel 11 and are sandwiched between the front panel 11 and the front frame 22A. Therefore, dust intruding from a gap between the front panel 11 and the inner edge of the opening 10b (see FIG. 2) formed in the housing main body 10a can be prevented, by the convex portion 31, from reaching the front surface of the display panel 21, i.e., the display area A.

As shown in FIGS. 4 and 5, the gaps G1 and G2 are formed on a side of the display panel unit 20 toward the front frame portion 32. Therefore, when the first convex portion 31A and the second convex portion 31B are pressed by the front panel 11, it is possible to bring the tops of the first convex portion 31A and the second convex portion 31B close to the height of the surface of the front frame portion 32. As a result, it is possible to reduce a gap E (see FIG. 2) between the front panel 11 and the display panel 21 and then reduce the thickness of the electronic device 1.

As shown in FIG. 4, the first convex portion 31A in this embodiment is formed at the inner peripheral edge of the front frame portion 32. Specifically, the first convex portion 31A projects from the inner peripheral edge of the front frame portion 32 toward the front panel 11. The inner peripheral edge of the front frame portion 32 is chamfered such that the gap G1 is formed between the inner peripheral edge of the front frame portion 32 and the front surface of the display panel unit 20 (in this embodiment, the front surface of the front frame 22A). Therefore, when the first convex portion 31A is pressed by the front panel 11, as indicated by an arrow D1 shown in FIG. 4, the inner periphery of the front frame portion 32 elastically tilts toward the front frame 22A. With such a structure in which the inner peripheral edge is chamfered, it is easy to form the gap G1. In other words, in a structure in which a groove is formed in a position away from the inner peripheral edge of the front frame portion 32, for example, in a structure in which the gap G1 is formed in the same manner as the gap G2 (see FIG. 5), it is necessary to use, in a manufacturing process of the dust-proof frame 30, a die that fits in the gap G1. However, with the structure shown in FIG. 4 in which the gap G1 is provided at the inner peripheral edge of the front frame portion 32, it is unnecessary to use such a die and thus it is easy to form the gap G1.

As shown in FIG. 5, the gap G2 is formed on a surface of the front frame portion 32 toward the front frame 22A. In other words, a groove extending in the direction along the second convex portion 31B is formed on a surface of the front frame portion 32 toward the front frame 22A. This groove causes the gap G2. Unlike the gap G1 and the first convex portion 31A, the gap G2 and the second convex portion 31B are located away from the inner peripheral edge of the front frame portion 32 toward an outer peripheral edge 32a of the front frame portion 32. Consequently, the positions of the gap G2 and the second convex portion 31B are far from the display area A. Therefore, it is possible to further reduce a load applied to the display area A when the second convex portion 31B is pressed by the front panel 11.

As shown in FIG. 5, the plate member 21c (e.g., a glass substrate) included in the display panel 21 projects further toward the outer side of the display panel 21, that is further downward, than the other plate members 21b and 21d. A driving circuit 21e for driving the display panel 21 is mounted on a projecting portion of the plate member 21c. Therefore, width W4 of a lower portion 22a (a portion that covers the lower edge of the display panel 21) of the front frame 22A is larger than the width of the other portions (i.e., upper, left, and right portions) of the front frame 22A. In this structure, when the second convex portion 31B is formed at the inner peripheral edge of the front frame portion 32, a large moment occurs in the lower portion 22a of the front frame 22A compared with the other portions of the front frame 22A when the second convex portion 31B is pressed by the front panel 11. As a result, a large load is applied to the display panel 21 through the lower portion 22a of the front frame 22A. The structure in which the gap G2 and the second convex portion 31B are located away from the inner peripheral edge of the front frame portion 32 can reduce the occurrence of such a moment.

As shown in FIGS. 4 and 5, the top surfaces of the first convex portion 31A and the second convex portion 31B have arcuate cross sections (the cross sections are defined as cross sections having, as their cut surfaces, surfaces orthogonal to the extending direction of the first convex portion 31A and the second convex portion 31B). In particular, in this embodiment, the cross sections of the tops have an arcuate shape. With this structure, compared with a structure in which the top surfaces of the first convex portion 31A and the second convex portion 31B have flat cross sections, the first convex portion 31A and the second convex portion 31B are easily deformed. Therefore, it is possible to further reduce the load applied from the front panel 11 to the front frame portion 32. As explained above, when the first convex portion 31A is pressed by the front panel 11, the inner periphery of the front frame portion 32 tilts toward the front frame 22A. In this embodiment, since the top surface of the first convex portion 31A has the arcuate cross section, it is possible to suppress a size of contact area between the top surface of the first convex portion 31A and the front panel 11 from changing when the front frame portion 32 tilts.

As shown in FIG. 2, the inner surface of the front panel 11 has a flat surface in a portion with which the first convex portion 31A comes into contact. In other words, a concave in which the first convex portion 31A fits is not formed in a position of the front panel 11 facing the first convex portion 31A. Therefore, the first convex portion 31A can smoothly fall down toward the front frame 22A when pressed by the front panel 11. The inner surface of the front panel 11 has a flat surface also in a portion with which the second convex portion 31B comes into contact (see FIG. 5). Therefore, since the position of the second convex portion 31B is not limited by the front panel 11, it is possible to locate the second convex portion 31B in a position appropriate for the display panel unit 20.

As shown in FIG. 6, a projection amount h of the first convex portion 31A is smaller than thickness T of the front frame portion 32. Therefore, a width W1 of the gap G1 in the thickness direction of the front frame portion 32 (that is, the thickness direction of the display panel unit 20; in this embodiment, the front-rear direction) can be easily secured in a size appropriate for the first convex portion 31A. In other words, it is easy to secure the width W necessary for the first convex portion 31A to fall down. Similarly, a projection amount of the second convex portion 31B is also smaller than the thickness T of the front frame portion 32. Therefore, the depth of the gap G2 can be easily secured in a size appropriate for the second convex portion 31B.

In this embodiment, as shown in FIG. 6, width W3 of the first convex portion 31A in a direction parallel to the front frame portion 32 is larger than the projection amount h. Similarly, the width of the second convex portion 31B in the direction parallel to the front frame portion 32 is also larger than the projection amount. Further, the first convex portion 31A and the second convex portion 31B in this embodiment project straight in the thickness direction of the front frame portion 32. Therefore, compared with a structure in which the two convex portions 31A and 31B are projected obliquely to the thickness direction of the front frame portion 32, it is easy to mold the convex portions 31A and 31B in a manufacturing process of the dust-proof frame 30.

As shown in FIG. 6, the inner peripheral edge of the front frame portion 32 includes, at an end face thereof, a slope 32c formed by chamfering of the inner peripheral edge and a vertical surface 32d parallel to the thickness direction of the front frame portion 32. The vertical surface 32d makes it easy to secure a distance D2 between the slope 32c and an edge formed between the first convex portion 31A and the base of the front frame portion 32. As a result, it is possible to secure the strength of the first convex portion 31A and the inner peripheral edge of the front frame portion 32 and thus it is easy to mold the dust-proof frame 30.

As shown in FIG. 2, the front panel 11 in this embodiment includes, in the outer periphery thereof, a flange portion 11a that spreads in parallel to the front panel 11. The front panel 11 is fit inside of the opening 10b of the housing main body 10a. The flange portion 11a is located along the inner surface of the housing main body 10a. The inner edge of the opening 10b is located further inwardly than the first convex portion 31A of the dust-proof frame 30. On the other hand, the outer peripheral edge of the flange portion 11a is located further outwardly than the first convex portion 31A. Therefore, it is possible to more effectively suppress external dust from passing between the inner edge of the opening 10b and the front panel 11 to reach the front surface of the display panel 21. Similarly, the inner edge of the opening 10b is located further inwardly than the second convex portion 31B. The outer peripheral edge of the flange portion 11a is located further outwardly than the second convex portion 31B.

As explained above, the electronic device 1 includes the buttons 2, the direction key 3, and the operation stick 4. The housing main body 10a has holes formed thereon and positioned outwardly from the outer periphery of the display panel 21, i.e., rightward and leftward from the display panel 21. The buttons 2, the direction key 3, and the operation stick 4 respectively project from the holes. Dust intruding from gaps between the holes and the operation members can be prevented from reaching the front surface of the display panel 21 by the first convex portion 31A and the second convex portion 31B.

Figure 7:
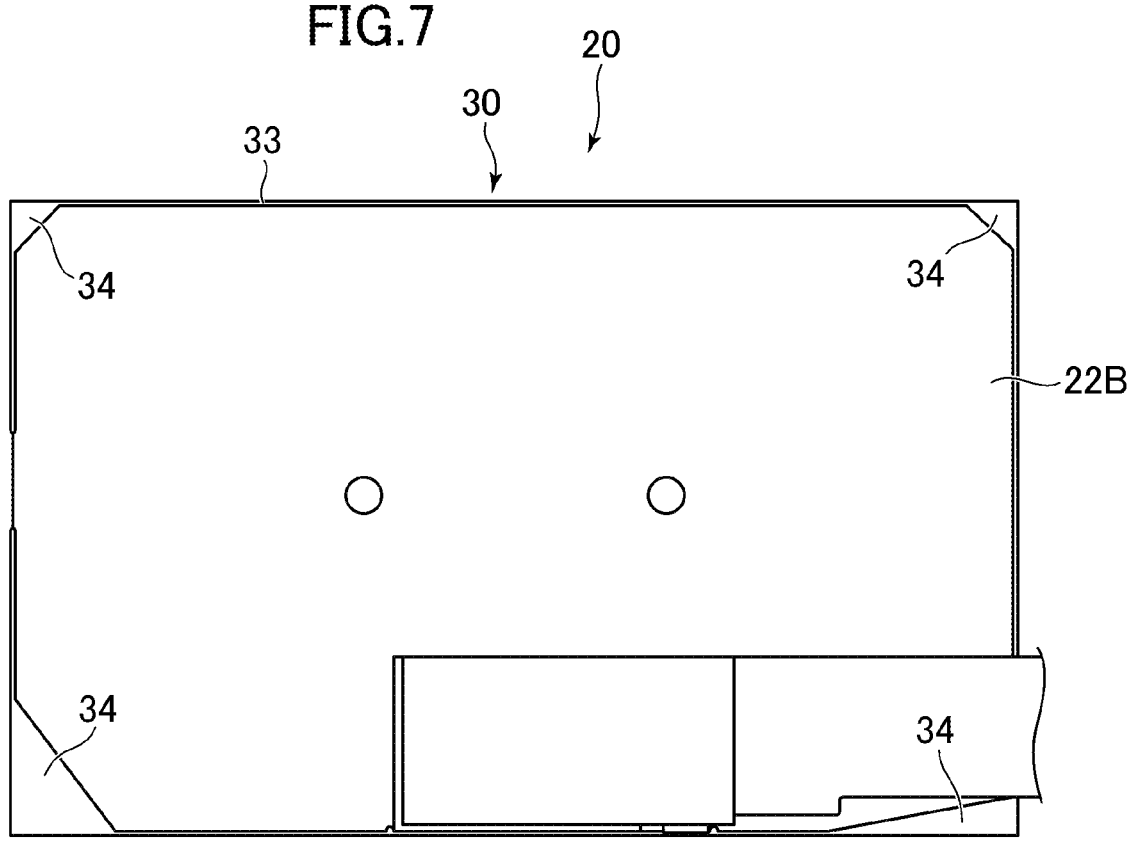
FIG. 7 is a rear view of the display panel unit.

FIG. 7 is a rear view of the display panel unit 20 to which the dust-proof frame 30 is attached. As shown in the figure, the dust-proof frame 30 has a shape for holding the display panel unit 20. Specifically, the dust-proof frame 30 includes a side surface portion 33 formed along the side surface of the display panel unit 20 and extending from the front frame portion 32 (see FIGS. 2, 4, and 5). The dust-proof frame 30 includes rear surface portions 34 that extends inwardly from the edge of the side surface portion 33 and is located on the rear side of the display panel unit 20 (see FIGS. 4 and 7). The dust-proof frame 30 holds the outer periphery of the display panel unit 20 with the front frame portion 32, the side surface portion 33, and the rear surface portions 34.

As explained above, the dust-proof frame 30 is formed of an elastic material such as elastomer. The size on the inner side of the side surface portion 33 is set slightly smaller than the size of the outer periphery of the display panel unit 20. A distance between the front frame portion 32 and the rear surface portions 34 is set slightly smaller than the thickness of the display panel unit 20. Therefore, the dust-proof frame 30 contacts closely to the display panel unit 20.

The front frame portion 32 and the side surface portion 33 are provided over the entire periphery of the display panel unit 20. On the other hand, the rear surface portions 34 are provided only at the corners of the display panel unit 20. Specifically, the dust-proof frame 30 includes four rear surface portions 34. The rear surface portions 34 are respectively located on the rear sides of the corners of the display panel unit 20 (see FIG. 7). As shown in FIG. 4, the housing 10 includes, on the inside thereof, a base portion 12 on which the display panel unit 20 is placed. The base portion 12 presses the rear surface portions 34 toward the inner surface of the housing 10 (in this embodiment, the inner surface of the front panel 11).

The rear surface portions 34 are provided only at the corners of the display panel unit 20. Therefore, a load applied to the dust-proof frame 30 from the base portion 12 through the rear surface portions 34 tends to act on the corner of the convex portion 31. The corner of the convex portion 31 has strength higher than the other portions of the convex portion 31 because of a bent shape of the corner. Therefore, with this structure in which the display panel unit 20 is supported by the rear surface portions 34, it is possible to increase durability of the dust-proof frame 30. With such a shape in which the rear surface portions 34 are provided only at the corners of the dust-proof frame 30, it is possible to simplify molding of the dust-proof frame 30.

In this embodiment, as shown in FIG. 4, the base portion 12 includes supporting portions 12a in positions corresponding to the rear surface portions 34. The supporting portions 12a are dented compared with the other portions of the base portion 12. However, the depth of the supporting portions 12a is smaller than the thickness of the rear surface portions 34. Therefore, the rear surface portions 34 are pressed toward the inner surface of the front panel 11 by the supporting portions 12a. A slight clearance is provided between the rear surface of the display panel unit 20 and the base portion 12.

As shown in FIG. 2, in a state in which the first convex portion 31A and the second convex portion 31B are pressed by the front panel 11 and in contact with the front surface of the front frame 22A, the front panel 11 (in this embodiment, the flange portion 11a) is in contact with the front frame portion 32. In other words, a distance D3 (see FIG. 4) to the front panel 11 from the supporting portions 12a that support the display panel unit 20 attached with the dust-proof frame 30 is equivalent to the thickness of the dust-proof frame 30 attached to the display panel unit 20. In particular, in this embodiment, the distance D3 is designed slightly smaller than the thickness of the dust-proof frame 30 attached to the display panel unit 20 before being integrated into the electronic device 1. Therefore, dust and the like on the outside of the electronic device 1 are prevented from intruding into the display area A by not only the convex portion 31 but also the front frame portion 32.

As explained above, the dust-proof frame 30 includes the front frame portion 32 located on the outer periphery of the front surface of the display panel unit 20. The dust-proof frame 30 includes the convex portion 31. The convex portion 31 projects from the front frame portion 32 toward the inner surface of the front panel 11, has a frame shape surrounding the display area A, and is pressed toward the display panel unit 20 by the inner surface of the front panel 11. The gaps G1 and G2 for allowing movement of the convex portion 31 in the pressing direction of the inner surface of the front panel 11 are formed in the pressing direction of the front panel 11 with respect to the convex portion 31. Therefore, it is possible to suppress permanent distortion from occurring in the dust-proof frame 30 and maintain the elastic force of the dust-proof frame 30 for a long period. As a result, it is possible to improve the dust-proof function.

The gaps G1 and G2 are located on a side of the display panel unit 20 toward the front frame portion 32. Therefore, when the first convex portion 31A is pressed by the front panel 11, it is possible to bring the top of the convex portion 31 close to the height of the front frame portion 32. As a result, it is possible to reduce the gap E between the front panel 11 and the display panel unit 20.

The first convex portion 31A is formed at the inner peripheral edge of the front frame portion 32. The inner peripheral edge of the front frame portion 32 is chamfered such that the gap G1 is formed between the inner peripheral edge of the front frame portion 32 and the front surface of the display panel unit 20 (the front surface of the front frame 22A). With this structure, it is easy to form the gap G1.

The second convex portion 31B and the gap G2 are located away from the inner peripheral edge of the front frame portion 32. With this structure, it is possible to reduce a load applied to the display panel 21.

The groove that causes the gap G2 is formed on the surface of the front frame portion 32 toward the display panel unit 20. With this structure, since it is unnecessary to machine the display panel unit 20 in order to cause the gap G2, it is easy to manufacture the display panel unit 20.

The top surfaces of the first convex portion 31A and the second convex portion 31B have the arcuate cross sections. With this structure, since the first convex portion 31A and the second convex portion 31B can be easily deformed, it is possible to suppress a load applied to the display panel 21. Concerning the first convex portion 31A that obliquely moves when pressed by the front panel 11, it is possible to suppress a change in a size of contact area (a contact area with the front panel 11) due to the oblique movement of the first convex portion 31A.

The inner surface of the housing 10, in this embodiment, the inner surface of the front panel 11 has the flat surface in the portion with which the first convex portion 31A comes into contact. Therefore, the first convex portion 31A can smoothly move when pressed by the front panel 11.

The projection amount of the first convex portion 31A and the second convex portion 31B is smaller than the thickness T of the front frame portion 32. Therefore, the width W1 of the gap G1 and the depth of the gap (groove) G2 can be easily secured in sizes appropriate for the first convex portion 31A and the second convex portion 31B.

The inner surface of the housing 10, in this embodiment, the inner surface of the front panel 11 is in contact with the front frame portion 32. With this structure, it is possible to further improve the dust-proof function.

The holes located outwardly from the outer periphery of the display panel unit 20 are formed in the housing 10. The operation members 2, 3, and 4 operated by the user are arranged in the holes. With this structure, dust intruding from gaps between the holes and the operation members can be prevented, by the convex portion 31, from reaching the front surface of the display panel 21.

Figure 8:
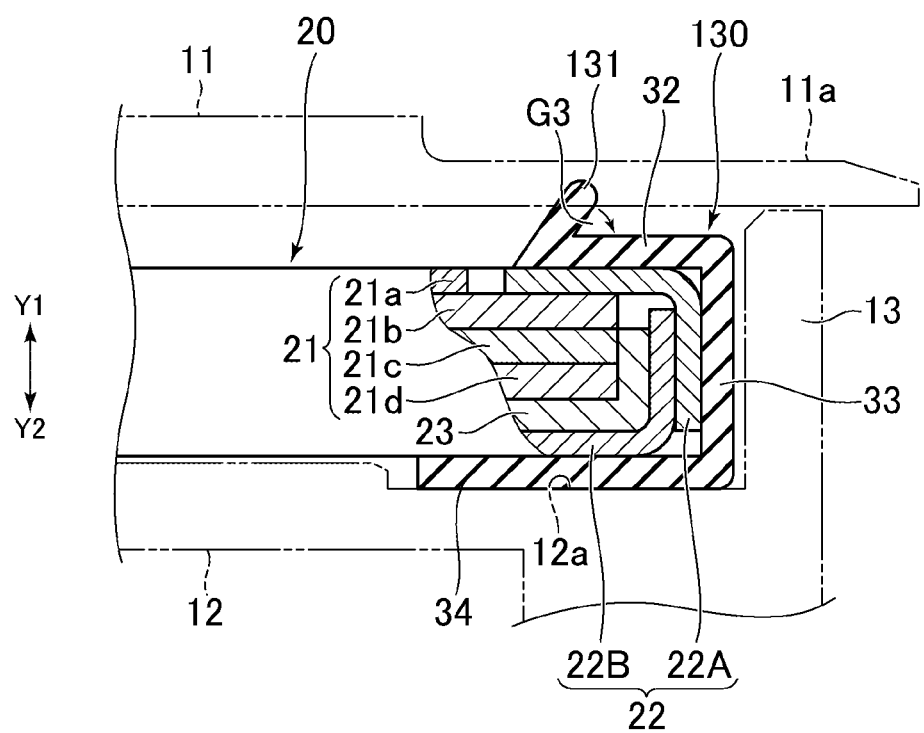
FIG. 8 is a sectional view of a dust-proof frame included in a portable electronic device according to another embodiment of the present invention.

FIG. 8 is a sectional view of the display panel unit 20 included in an electronic device according to another embodiment of the present invention. A cut surface to obtain FIG. 8 is the same as the cut surface indicated by line V-V shown in FIG. 3. In FIG. 8, portions same as the portions explained above are denoted by the same reference numerals and signs. In the following explanation, differences from the electronic device 1 explained above will be explained. Similarities to the electronic device 1 are not explained.

As shown in FIG. 8, the electronic device in this embodiment includes a dust-proof frame 130 provided on the outer periphery of the display panel unit 20. The dust-proof frame 130 includes the front frame portion 32 located on the outer periphery of the front surface of the display panel unit 20. The dust-proof frame 130 includes a convex portion 131. The convex portion 131 is formed over the entire periphery of the dust-proof frame 30 and has a frame shape surrounding the display area A of the display panel unit 20. The convex portion 131 projects from the front frame portion 32 toward the inner surface of the housing 10 (in this embodiment, the inner surface of the front panel 11) and pressed toward the outer periphery of the display panel unit 20 by the inner surface of the housing 10.

A gap (groove) G3 extending in a direction along the convex portion 131 is provided in the dust-proof frame 130. The gap G3 is located in a pressing direction of the front panel 11 with respect to the convex portion 131, i.e., located behind the convex portion 131 and allows movement of the convex portion 131 in the pressing direction. In other words, the dust-proof frame 130 has a shape obtained by cutting out a portion located behind the convex portion 131 such that the gap G3 is formed. Unlike the convex portion 31 explained above, the convex portion 131 in this embodiment projects obliquely to the thickness direction of the display panel 21 toward the inner surface of the front panel 11. In particular, in this embodiment, the convex portion 131 obliquely projects toward the outer side of the outer periphery of the display panel unit 20. Therefore, the gap G3 is located between the convex portion 131 and the front frame portion 32. When the convex portion 131 comes into contact with the front panel 11, the convex portion 131 elastically tilts toward the front frame 22A due to the gap G3. As a result, it is possible to reduce a load applied to the front panel 11 and the display panel 21. It is possible to suppress permanent distortion from occurring in the dust-proof frame 130. It is possible to maintain the elastic force of the dust-proof frame 130 for a long period. As a result, tight contact between the convex portion 131 and the front panel 11 is maintained, and thus the dust-proof function can be improved. The gap G3 is caused in a state before the front panel 11 is pressed against the convex portion 131. The gap G3 does not always have to be present in a state in which the front panel 11 is pressed against the convex portion 131.

Like the convex portion 31, the surface of the top of the convex portion 131 has an arcuate cross section. With this structure, the convex portion 131 can smoothly fall down when pressed by the front panel 11. As explained above, the inner surface of the front panel 11 has a flat surface in a portion with which the convex portion 131 comes into contact. Therefore, the convex portion 131 can more smoothly fall down.

As explained above, the convex portion 131 obliquely projects toward the outer side of the outer periphery of the display panel 21. In particular, in this embodiment, the convex portion 131 obliquely projects from the inner peripheral edge of the front frame portion 32. The gap G3 is formed between the convex portion 131 and the front frame portion 32. As a result, even when dust intruding into the housing 10 reaches the front frame portion 32, the dust stays inside the gap G3. Therefore, it is possible to more effectively prevent the dust from reaching the front surface of the display panel 21.

The present invention is not limited to the embodiments explained above. Various modifications of the embodiments are possible.

For example, in the above explanation, the housing 10 includes the front panel 11. However, the housing 10 does not have to include the front panel 11. In this case, the user can see a display screen of the display panel 21 through the opening 10b formed in the housing main body 10a.

In the above explanation, the dust-proof frames 30 and 130 have the side surface portion 33 and the rear surface portions 34. However, the dust-proof frame 30 does not have to include the side surface portion 33 and the rear surface portions 34. In this case, the front frame portion 32 of the dust-proof frame 30 may be bonded to the surface of the display panel unit 20, for example, the front surface of the front frame 22A.

In the above explanation, the electronic device 1 is the game device including the operation members on the right side and the left side of the display panel 21. However, the electronic device 1 does not have to include such operation members. The present invention may be applied to other portable electronic devices such as a cellular phone.

The convex portion 131 of the dust-proof frame 130 obliquely projects outwardly from the front frame portion 32 toward the front panel 11. However, the convex portion 131 of the dust-proof frame 130 may obliquely project inwardly from the front frame portion 32 toward the front panel 11. In this case, a gap is formed between the convex portion 131 and the display panel unit 20.

The gaps G1, G2, and G3 may be caused by grooves formed on the surface of the display panel unit 20 (in the embodiments explained above, the surface of the front frame 22A).

What is claimed is:
1. A portable electronic device comprising: a housing; a display panel unit arranged inside the housing; a dust-proof frame made of an elastic material and arranged on an outer periphery of the display panel unit, the dust-proof frame including a front frame portion located on an outer periphery of a front surface of the display panel unit and a convex portion projecting from the front frame portion toward an inner surface of the housing, the convex portion having a frame shape surrounding a display area of the display panel unit and pressed toward the display panel unit by the inner surface of the housing, wherein a first gap and a second gap are positioned with respect to the convex portion in a pressing direction in which the inner surface of the housing presses the convex portion, and allows movement of the convex portion in the pressing direction of the inner surface of the housing, wherein the convex portion includes: a first singular convex portion located at an inner peripheral edge of the front frame portion which is pressed into the first gap by the inner surface of the housing; and a second singular convex portion located away from the inner peripheral edge of the front frame portion toward an outer peripheral edge of the front frame portion, wherein the first gap and the second gap are formed below the first singular convex portion and the second singular convex portion, respectively, wherein the front frame portion has four edges, and wherein the first singular convex portion is only formed on three of the four edges of the front frame portion and the second singular convex portion is only formed on a fourth edge of the front frame portion.

2. The portable electronic device according to claim 1, wherein the first gap and the second gap are located on a side of the front frame portion toward the display panel unit.

3. The portable electronic device according to claim 2, wherein the inner peripheral edge of the front frame portion is chamfered on the three edges where the first singular convex portion is formed such that the first gap is formed between the inner peripheral edge of the front frame portion and the front surface of the display panel unit.

4. The portable electronic device according to claim 3, wherein a top surface of the first singular convex portion has an arcuate cross section.

5. The portable electronic device according to claim 4, wherein the inner surface of the housing has a flat surface in a portion with which the first singular convex portion comes into contact.

6. The portable electronic device according to claim 2, wherein the second singular convex portion and the second gap are located away from an inner peripheral edge of the front frame portion only on the fourth edge of the front frame portion.

7. The portable electronic device according to claim 6, wherein a groove that causes the second gap is formed on a surface of the front frame portion toward the display panel unit.

8. The portable electronic device according to claim 2, wherein a projection amount of the first singular convex portion and a projection amount of the second singular convex portion is smaller than thickness of the front frame portion.

9. The portable electronic device according to claim 2, wherein the inner surface of the housing is in contact with the front frame portion.

10. The portable electronic device according to claim 1, wherein
   a hole located on an outer side of the outer periphery of display panel unit is formed in the housing, and
   an operation member operated by a user is arranged in the hole.

\* \* \* \* \*